United States Patent [19]
Eckhart

[11] Patent Number: 5,449,100
[45] Date of Patent: Sep. 12, 1995

[54] CARRIER FOR SKIS AND SKI POLES

[76] Inventor: Richard A. Eckhart, P.O. Box 7299, Thousand Oaks, Calif. 91359

[21] Appl. No.: 101,365

[22] Filed: Aug. 2, 1993

[51] Int. Cl.⁶ .................................................. B60R 9/08
[52] U.S. Cl. ............................... 224/509; 414/462;
403/108; 403/109; 403/292; 403/378; 224/510;
224/521; 224/532; 224/535; 224/536;
224/917.5
[58] Field of Search ............... 224/42.03 R, 42.04,
224/42.05, 42.06, 42.07, 42.08, 42.03 A, 42.03
B, 42.45 R, 282; 414/462; 403/108, 109, 292,
378

[56] References Cited

U.S. PATENT DOCUMENTS

| | | | |
|---|---|---|---|
| 1,693,202 | 11/1928 | Henderson | 224/42.45 R X |
| 3,159,368 | 12/1964 | Ahlbin et al. | 224/42.45 R |
| 4,676,414 | 6/1987 | DeGuevara | 224/42.03 R |
| 4,738,316 | 4/1988 | Wood | 403/108 X |
| 4,915,276 | 4/1990 | Devito | 224/42.45 R X |
| 5,029,740 | 7/1991 | Cox | 224/42.08 X |
| 5,038,983 | 8/1991 | Tomososki | 224/42.07 X |
| 5,181,822 | 1/1993 | Allsop et al. | 414/462 |
| 5,244,133 | 9/1993 | Abbott et al. | 224/42.03 B |
| 5,259,821 | 11/1993 | Bryant | 403/378 X |

FOREIGN PATENT DOCUMENTS

0888312  7/1949  Germany ........................ 403/108

*Primary Examiner*—J. Casimer Jacyna
*Attorney, Agent, or Firm*—Ashen Golant & Lippman

[57] ABSTRACT

An improved bracket for mounting a carrier on a vehicle for carrying objects such as skis and ski poles. The illustrated bracket supports the carrier at the rear of the vehicle. The bracket is firmly and rigidly supports the carrier so as to limit tilting or swaying of the carrier as the vehicles moves. In a preferred form the bracket allows the carrier to be moved out of way to the side when access to the rear or the vehicle is desired. The illustrated carrier includes an elongated upright section that supports holder units for holding the skis and poles.

37 Claims, 9 Drawing Sheets

CARRIER FOR SKIS AND SKI POLES

FIELD OF THE INVENTION

Brackets for mounting carriers on vehicles for carrying objects such as skis and ski poles.

BACKGROUND OF THE INVENTION

There are many prior art brackets for mounting carriers on vehicles to transport articles such as skis and ski poles. A major problem has been the failure of such brackets to firmly and rigidly hold the carrier while the vehicle was being driven, often over rough, bumpy terrain.

A related problem of carriers that have an upright section is a tendency for the upright section to sway from side to side as the vehicle is driven. This may not be harmful in fact, but appears problematic to the user and is therefore undesirable from practical marketing viewpoint.

SUMMARY OF THE DISCLOSURE

The illustrated bracket addresses itself to various of these deficiencies of the prior art.

The illustrated mounting bracket firmly and rigidly supports carriers and in particular limits side to side swaying of carriers that have elongated upright sections. More particularly, the illustrated bracket includes in interlocking and camming arrangement or mechanism that firmly and rigidly locks the racket and the carrier to the vehicle.

The illustrated mounting bracket may also allow easily movement, when desired, of the carrier to afford access to the vehicle. More particularly, the illustrated bracket is normally locked in position to hold the carrier in its transporting position at the rear of the vehicle. The bracket may be unlocked to allow the carrier to be moved to the side away from the vehicle rear so as to provide access to a tire or a rear door or panel of the vehicle.

DETAILED DESCRIPTION OF THE DRAWINGS

Figure 1:
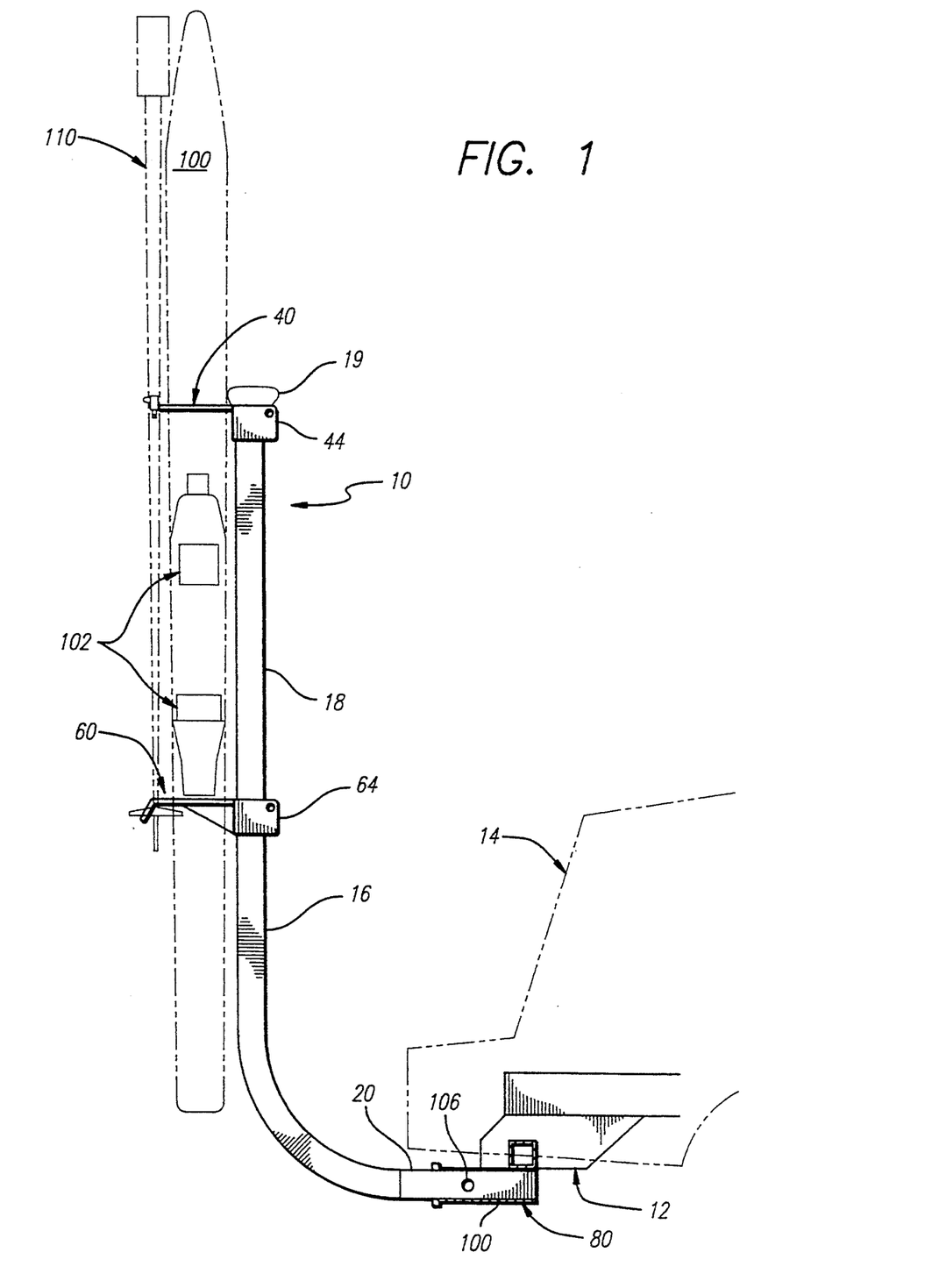
FIG. 1 is a schematic side view of the carrier comprising a presently preferred embodiment of the invention, shown mounted at the rear of a motor vehicle and with a pair of skis and poles supported by the carrier.

FIG. 1 illustrates schematically the bracket 80, which is a present preferred form of the invention, mounted to the trailer hitch 12 of a motor vehicle 14. The bracket 80 is shown supporting a carrier 10 for skis and ski poles.

The illustrated carrier 10 includes a frame in the form of an elongated rigid bar or rod 16 which is generally L-shaped and made of a strong tough material such as steel or metal alloy. The frame rod 16 includes a main upright section 18 and a forwardly extending lower support section 20. The lower support section 20 is releasably locked by the bracket 80 to the trailer hitch 12 at the rear underside of the vehicle. The upright section 18 is normally and desirably positioned generally centered side-to-side of the vehicle.

Figure 2:
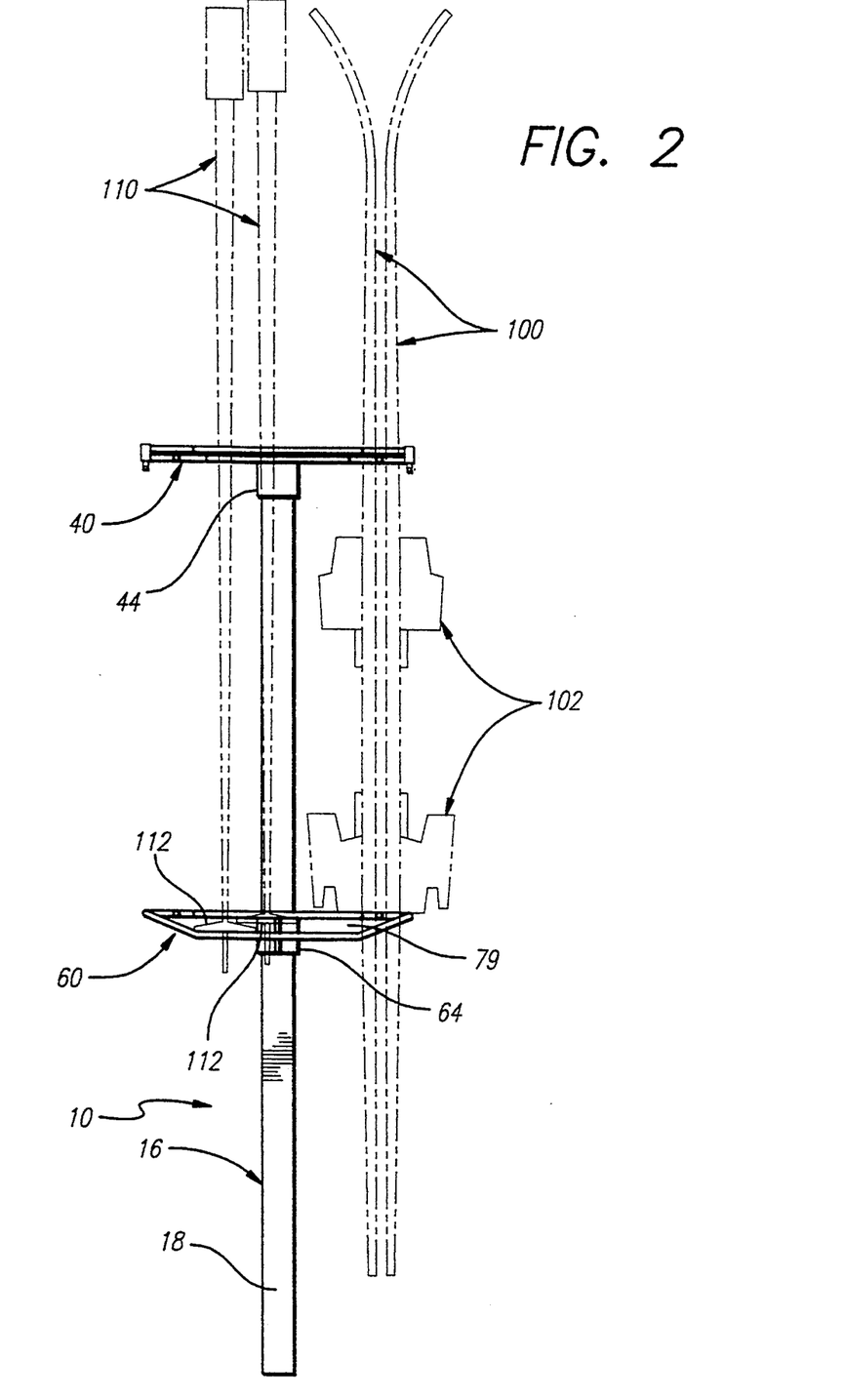
FIG. 2 is a schematic rear view of the carrier of FIG. 1.

A pair of holder units are mounted on the upright frame rod section 18. As shown best in FIGS. 1 to 3, there is an upper holder unit 40 and a lower holder unit 60. FIGS. 1 and 2 illustrate, in broken line, the positions of a pair of skis and a ski poles 110 mounted on the illustrated carrier 10. In general, the skis and poles are mounted upright, with the upper end portions of the skis extending through individual mating receptacles 42 in the upper holder unit, and with the lower end portions at the other end of the skis ending through individual mating receptacles 62 in the lower holder unit. The upper and lower units 40, 60 are spaced-apart so that the bindings 102 of the skis are positioned between the two units. In this way, the lower holder unit 60 also engages the bindings 102 to provide vertical support for the skis. When all of the receptacles 42, 62 are closed and locked, this also prevent unauthorized removal of the skis from the carrier.

The holder units 40, 60 may be mounted on the upright frame section 18 for limited vertical movement and adjustment to accommodate various size and configuration skis. The illustrated upright section 18 is generally rectangular in cross-section, and each of the holder units includes a generally rectangular U-shaped bracket 44, 64 which is telescoped on the upright section. Means such as a tightenable bolt and nut combination 46, 66 may be provided across the legs of the bracket 44, 64 to lock the holder units 40, 60 at the desired vertical locations along the upright frame section 18. For security purposes, the upper end of the upright section (see FIG. 1) may have an enlarged portion 19 which will not permit the upper holder unit to be completely removed from the upright section. Similarly, the downward movement of the lower holder unit 60 is limited by the curvature of the illustrated frame rod 16. In this way, the skis and poles cannot be removed from the carrier by an unauthorized person who does not have a key or the combination to open the carrier to allow access to the skis and poles. The brackets 44, 64 may completely surround the upright section 18, or may be U-shaped as illustrated in the drawings. The U-shaped brackets 44, 64 may provide a clamping action around the upright section 18. The adjusting bolt and nut combinations 46, 66 may be provided with suitable locking or retaining means (not shown) so that they cannot be removed by an unauthorized person without a key or a combination. For example, the bolt may be a so-called "one-way" bolt that requires a special tool for its removal from the nut or other threaded receptacle.

Alternatively, the upright frame section could have a different cross-section such as elliptical and the brackets could match that shape.

As shown in the drawings, each of the illustrated holder units 40, 60 is a rigid, solid, generally flat rectangular open-frame, single, integral part (except for the openable locking gate). They may be fabricated from sections or lengths of rod or the like of a hard resistent material such as steel or other alloy metals. Desired results have been achieved with steel rod having a thickness of about 0.50 inch diameter. Generally, a range of about 0.250 inch to about 0.625 inch minimum thickness (without the outer layer or coating) should provide satisfactory security. Preferably, the minimum thickness should not be less than 0.250 of an inch. The lengths could be rectangular or other shapes in the cross-section. The lengths may be welded or otherwise formed to provide the tough, rigid, solid and unitary structures. The units could be die cast, molded or otherwise fabricated. This type of construction provides stability and also security. As noted above, the structure may be coated with a rubber or plastic layer to protect the skis. Preferably, this layer is seamless and continuous (except for several cuts to allow for the openable gate).

The illustrated lower unit 60 is disposed generally horizontally. It includes a transversely extending elongated forward section 70 that is connected to a plurality of elongated rearwardly extending separator sections 72. There are six illustrated separator sections 72 which accommodate two pair of skis and two pair of poles. The two interior-most separator sections 72a are connected together at their rearward ends by a transversely extending elongated middle section 74. There is a set of three of the separator sections 72 at each side of the holder. Each such set of three separator sections 72 defines a pair of the receptacles 62 in the form of front-to-rear extending slots. There is one receptacle or slot 62 for each ski of a pair. These slots 62 are opened at their rearward ends for easy transverse insertion and removal of the skis.

The two exterior-most separator sections 72b are further elongated rearwardly and are connected to a transversely extending elongated rearward section 76. The rearward section 76 includes a center portion 77 and a pair of side portions 78. The side portions 78 each incline rearwardly and downwardly from the rearward ends of the exterior two separator sections 70b. The side portions 78 are then connected at their inward ends to the center portion 77. The center portion 77 extends horizontally, parallel to and rearwardly of the transversely extending middle section 74. The center portion 77 is also spaced a short distance below the middle section 74.

The transversely extending space between the middle section 74 and the center portion 77 of the rearward section defines an elongated transversely extending receptacle 79 through which portions of the ski poles may extend. As shown best in FIGS. 1 and 2, the cups 112 of the ski poles are spaced a short distance above the lower ends of the poles. When the ski poles 110 are mounted in the receptacle 79, the cups 112 extend beyond the slot or receptacle, both forwardly and rearwardly, to retain the ski poles against upward or downward movement. More particularly, undersides of the rearward most portions of the cups 112 abut the top of the center portion 77 of the rearward section 76 to provide vertical support for the poles. The top surfaces of the forward most portions of the cups 112 are limited in upward movement by the bottom of the middle section 74. Each ski pole is restrained against forward movement by the middle section 74 engaging the pole above its cup, and against rearward movement by the center portion 77 of the rear section 76 engaging the pole below its cup (see FIGS. 1 and 2).

Thus, the lower unit 60 restricts upward, downward, forward and rearward movement of the lower portions of the ski poles. It does not limit transverse or sideward movement of those lower portions, but rather it allows such sideward movement for inserting the poles into the receptacle 79 and for removing the poles from the receptacle. It is the upper unit 40 which, through engagement with the upper portions of the poles, limits side to side movement of the poles when they are mounted on the carrier. Thus once the lower portions of the poles 110 are received in the receptacle 79 of the lower unit 60 and the upper portions are confined in the upper unit 40, the poles cannot be readily removed from the carrier.

Figure 8:
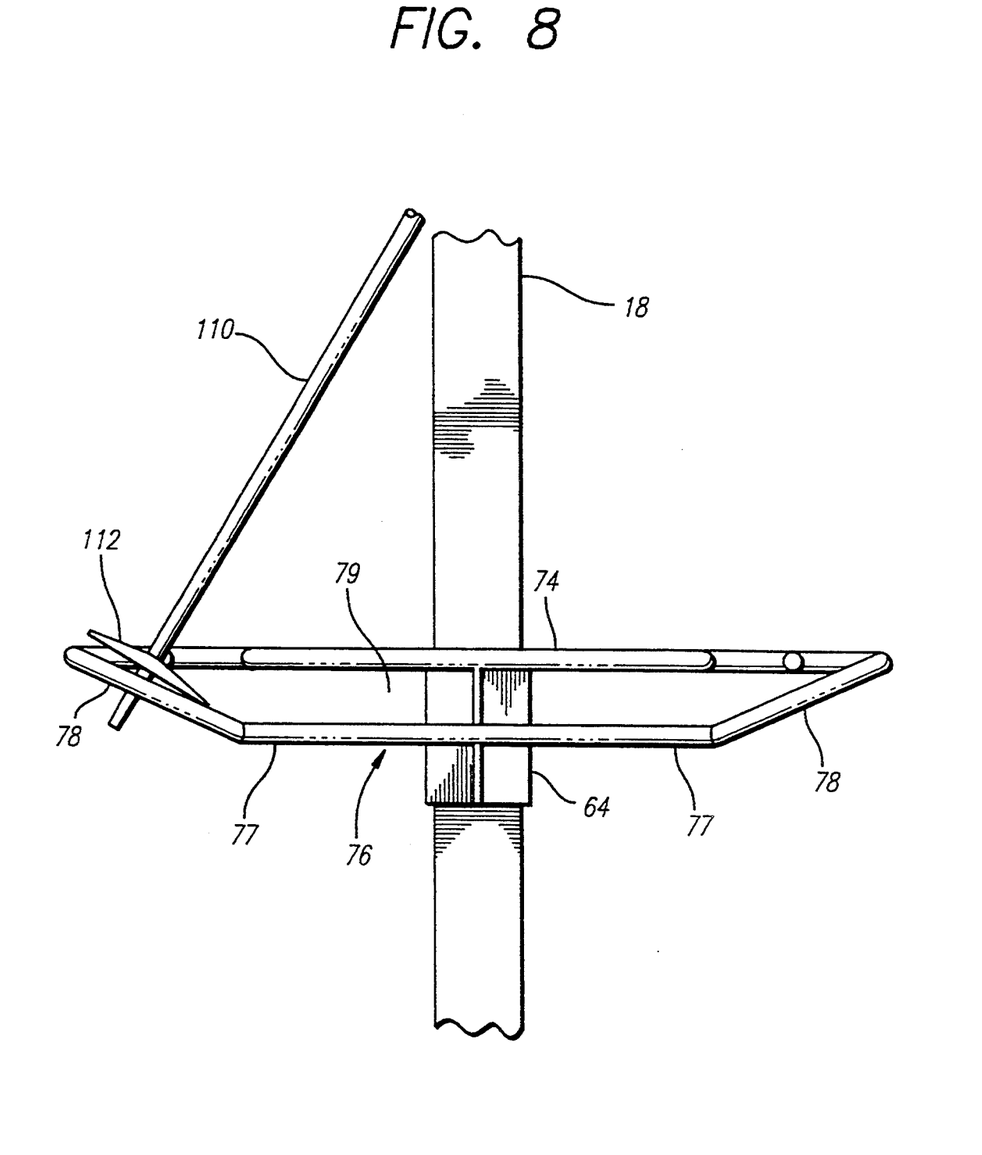
FIG. 8 is an enlarged rear view of the lower portion of the carrier with a ski pole being inserted.

To insert the lower portion of a pole 110 into the receptacle 79, the pole may be tilted somewhat from the horizontal as shown in FIG. 8. Then the pole end below the cup 112 inserted into the space to the outside of the interior-most separator section 72a, and the cup 112 is slide sideways into position below the middle section 74 and above the center portion 77. This also positions the pole end below the cup in the receptacle 79 forwardly of the center portion 77 and the pole shaft above the cup rearwardly of the middle portion 74. The poles may be slide inwardly along the receptacle 79 to a desired location. As shown in FIG. 2, with a plurality of poles in the receptacles 79, their cups may overlap on another.

The upper holder unit 40 is generally similar to the lower unit 60. The upper holder unit 40 is provided, however, with a gate or locking closure in the form, in the illustrated device, of a pivoted elongated arm 43.

The upper holder unit 40 which is disposed generally horizontally, includes a transversely extending elongated forward section 50 and a plurality of spaced-apart forwardly extending elongated separator sections 52. Similarly to the lower unit, the separator sections 52 are arranged three at each side to form two separate receptacles 42 at each side of the holder unit. These receptacles 42 are generally vertically aligned with the receptacles 62 of the lower holder unit. Each of the receptacles 42 is in the form of a generally front-to-rearward elongated slot that generally conforms to the size and shape of an individual ski 100. As shown in the drawings, the opposite end portions of the skis extend through these receptacles 42, 62 in the upper and lower holder units. The receptacles 42 are open at their rearward ends for easy insertion and removal of the skis. As with the lower holder unit, the two interior-most separator sections 52a are connected at their rearward ends by a transversely extending elongated middle section 54. Similarly, the two exterior-most separator sections 52b are extended further rearwardly and support between them the transversely extending elongated gate 43. The gate 43 is loosely pivotally mounted at one end 46 and has a depending latch finger 47 at its other end to releasably engage a suitable vertical latch opening at the rear end of on the adjacent separator section 52b. The loose pivot allows the far end of the gate 43 and the finger 47 to be elevated slightly above the rear end of the separator length 52b so the finger can be inserted into the latch opening. The finger 47 is long enough to extend below the end.

The gate 43 has a central portion 57 which is jogged rearwardly to define a receptacle in the form of a transverse slot 45 between it and the middle section 54. The upper portions of the ski poles 110 extend through and are held in this slot 45 when the gate 43 is closed. The closed gate 43 also serves to close the ski-holding receptacles 42 of the upper holder unit 40 to lock the skis 100 in place in their respective receptacles.

As noted above, the entire holder unit may be given a seamless coating, as from a dipping operation. This could be done with the gate closed; then the coating could simply be cut or slit at each end of the gate 43 to allow pivoting and latching of the gate.

The illustrated gate 43 may be provided with suitable latching means such as a pin 49 which is releasably received in a hole in the lower end of the latch finger 47 (see FIG. 3) to maintain the gate 43 closed. A suitable lock could be provided in place of the pin 49 for easy locking and unlocking of the gates. This arrangement provides easy access to the skis and poles, while providing security for the skis and poles in the carrier when the gate is closed and locked in place.

Figure 3:
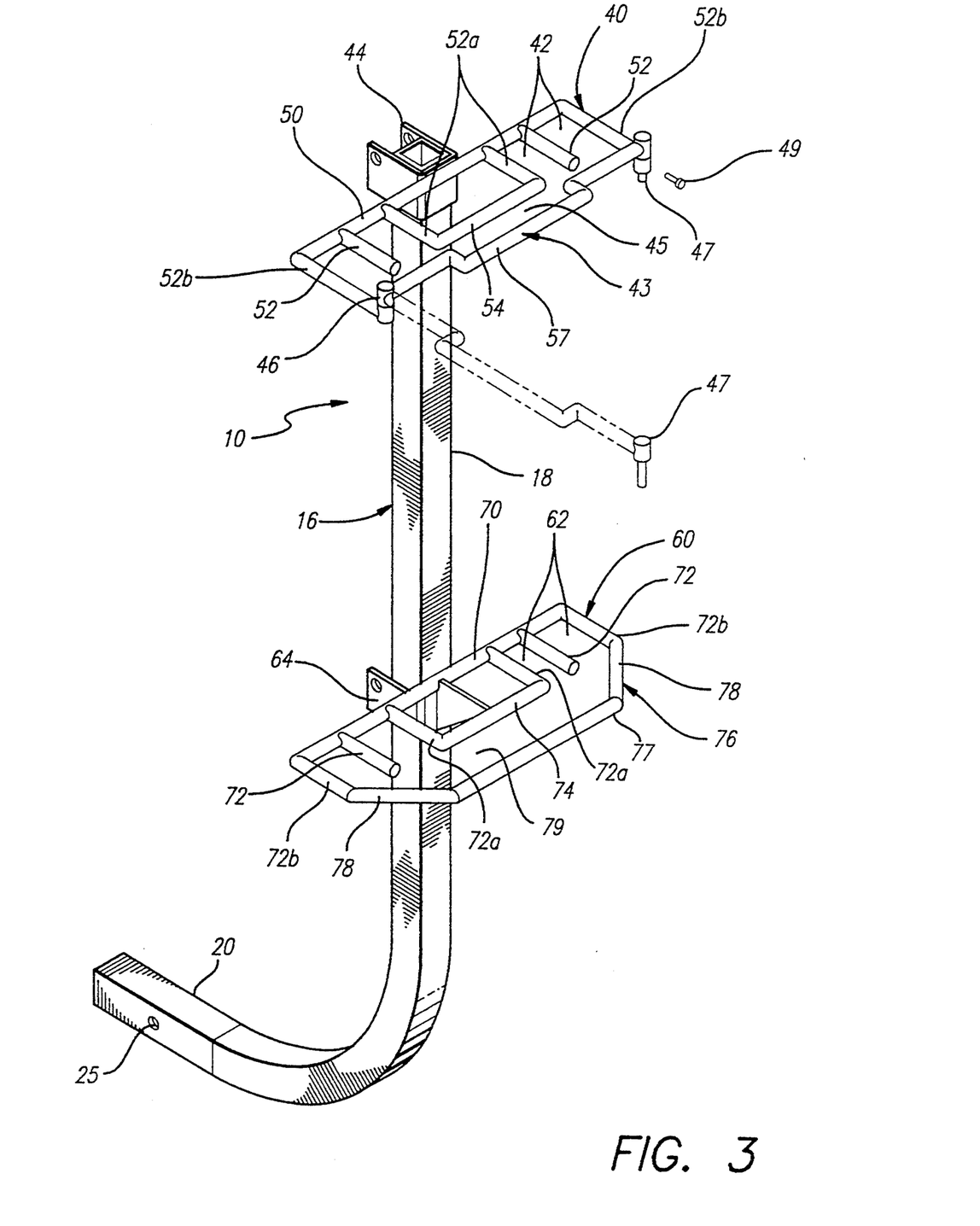
FIG. 3 is a schematic perspective view showing the carrier.
Figure 4:
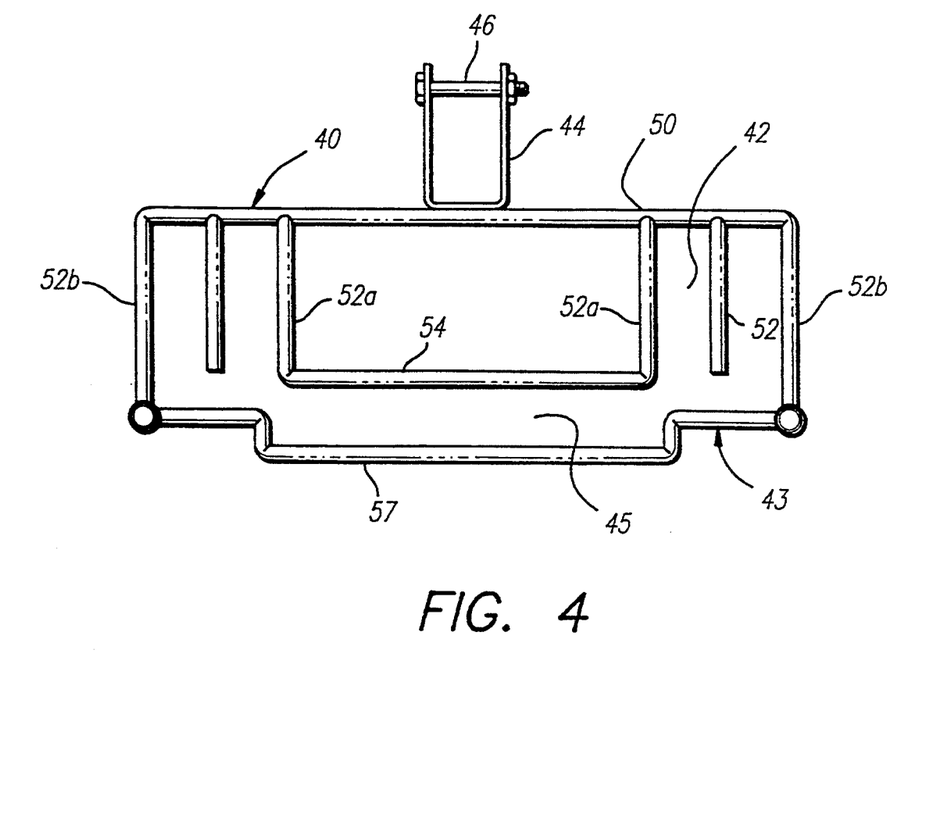
FIG. 4 is a top plan view of the upper holder unit of the carrier.
Figure 5:
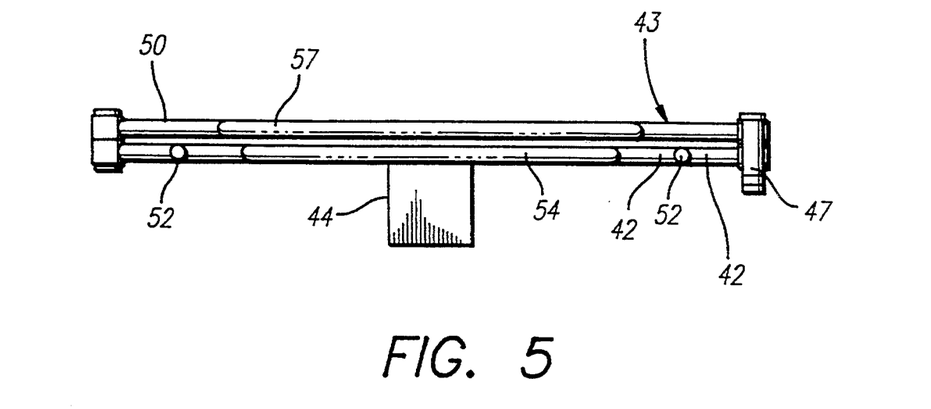
FIG. 5 is a rear view of the upper holder unit of the carrier.
Figure 6:
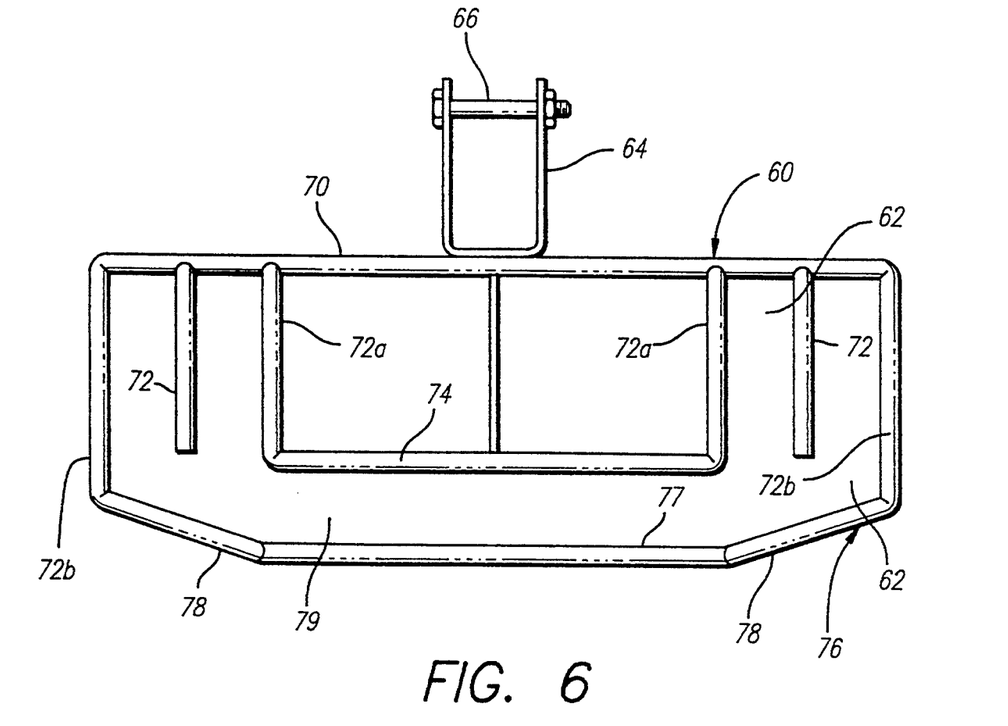
FIG. 6 is a top view of the lower holder unit of the carrier.
Figure 7:
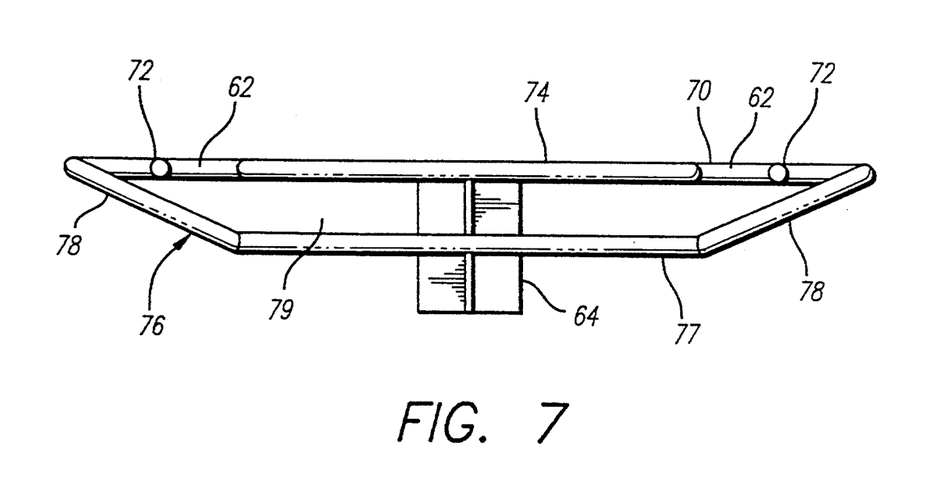
FIG. 7 is a rear view of the lower holder unit of the carrier.

In operation, to open the gate 43 of the upper holder unit 40, the pin 49 (or a lock) may be removed, the gate tilted upward to remove the latch finger 47 from the matting latch opening, and the gate swung to the open position shown in broken line in FIG. 3. This provides access to the receptacles 42 and 45. The skis and poles may then be mounted generally upright in the holder units 40, 60 of the carrier. More particularly, each ski 100 may be raised up and its lower end lowered down into a mating receptacle 62 of the lower holder unit 60. The upper end of the ski may then be swung forwardly into a mating receptacle 42 of the upper holder unit 40. Similarly, each ski pole 110 may be tilted as shown in FIG. 8 and the cup 112 adjacent to its lower end may be slid from one side or the other into the receptacle 79 of the lower holder unit 60. The upper ends of the poles are then positioned generally upright against the middle section 54 of the upper holder unit in the receptacle 45. The gate 43 may then be closed to hold the skis and poles in their respective receptacles, and the gate may be locked.

As noted above, a suitable bracket 80 may be provided at the base of the upright frame section 18 for allowing the upright section, the holder units, and the skis and poles to be selectively moved out of the way to provide access to the rear of the vehicle. For example, this would provide access to a tire mounted at the rear of the vehicle or to rear door or hatch to the vehicle. The bracket 80 would normally be locked to maintain the section 18 in its upright position. The bracket may be selectively unlocked or unlatched, however, to allow the upright section to pivot about its lower end either rearwardly or to one side, to provide the desired access.

It is of particular importance that the bracket hold the upright carrier firmly and solidly in its upright position as the vehicle is driven.

Stability, or more accurately the appearance of stability, are of prime importance to the purchasers and users of such carriers. The illustrated carrier includes elongated upright rod or pole on which the remainder of the carrier is supported. This pole is visible to the driver and the other occupants of the vehicle through the rear window as the vehicle is being driven. The motion of the vehicle as it proceeds along a roadway, as it goes over bumps or irregularities and as it turns, applies substantial forces to the upright rod and the carrier parts as well as the objects being carried. In particular, there is a tendency for the rod to sway from side to side since it is a large upright arm secured at the bottom and having substantial weight at the upper portions that exert side to side force. The side to side movement or swaying can be particularly unnerving and upsetting to the driver of the vehicle looking in the rear view mirror and observing such movement. Even if such movement is not in fact harmful, it is highly desirable from a marketing and merchandising standpoint to have a product that minimizes such side to side swaying or movement.

FIGS. 9–12 illustrate the bracket 80 for supporting the carrier 10 on the vehicle.

The illustrated bracket 80 is operable to firmly and tightly hold the upright rod 18 of the illustrated carrier so as to greatly reduce and minimize any such side to side swaying or movement, while also providing for the carrier to be selectively moved out of the way to the side.

The illustrated bracket is desirable fabricated from a strong, durable, rigid material such as steel or various metal alloys.

In general, as shown in the drawings, the illustrated bracket 80 comprises a first tubular bracket portion 100 that is solidly and rigidly connected to the underside of the vehicle by suitable means (not shown). The first portion 100 solidly and rigidly receives and retains a second bracket portion 110. The second portion 110 normally rigidly and firmly receives and supports the horizontal forward extension 20 of the upright carrier rod section 18, but also allows the extension and thereby the carrier and its load to be unlocked, shifted rearwardly and pivoted off to the side to provide access to the rear of the vehicle.

Figure 9:
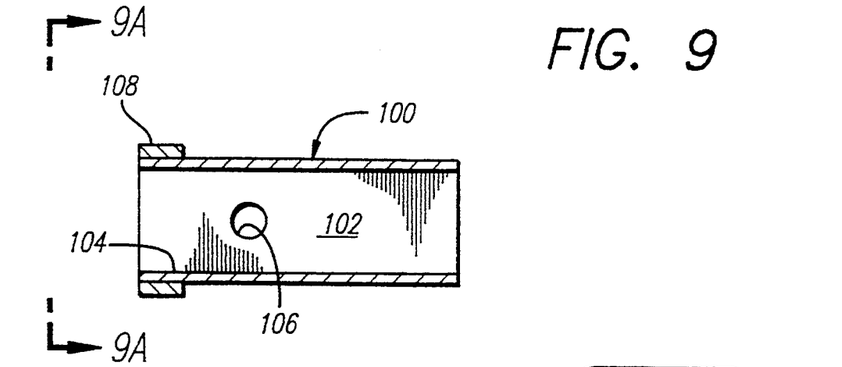
FIG. 9 is a schematic side view of a first portion of the bracket that supports the carrier on the vehicle.
Figure 9A:
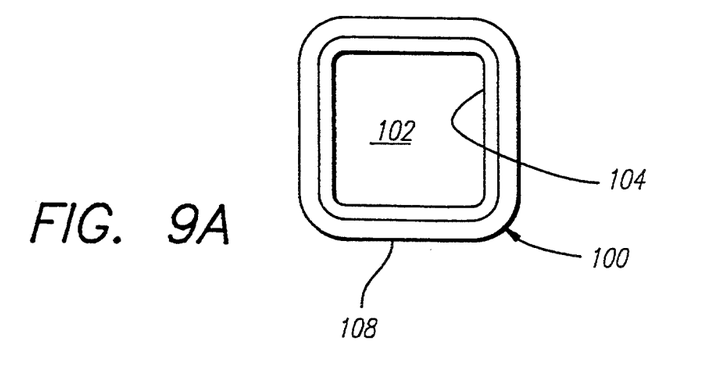
FIG. 9A is a schematic end view of the portion of FIG. 9, as viewed from the left of FIG. 9.

More particular, as shown in FIGS. 9 and 9A, the first bracket portion 100 is elongated and generally square in cross-section, having an elongated internal receptacle 102 that is square in cross-section and has a rearwardly opening square entrance or mouth 104.

Figure 10:
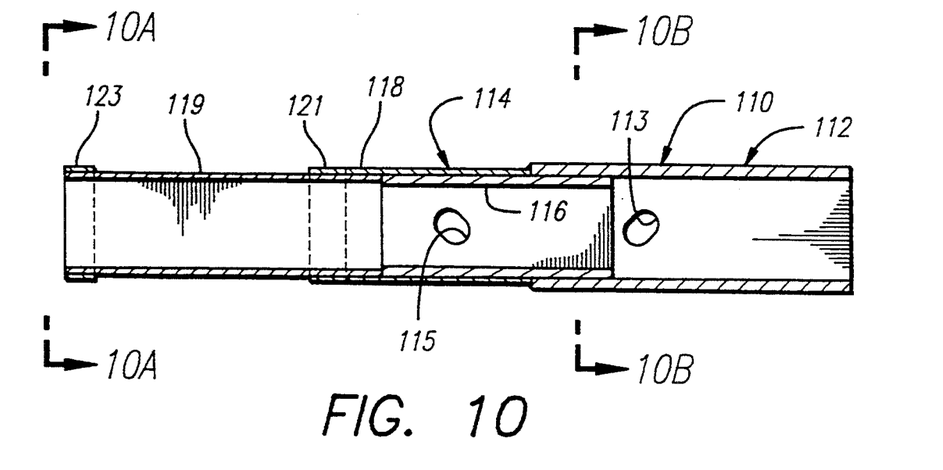
FIG. 10 is a schematic side of a second portion of the bracket.
Figure 10A:
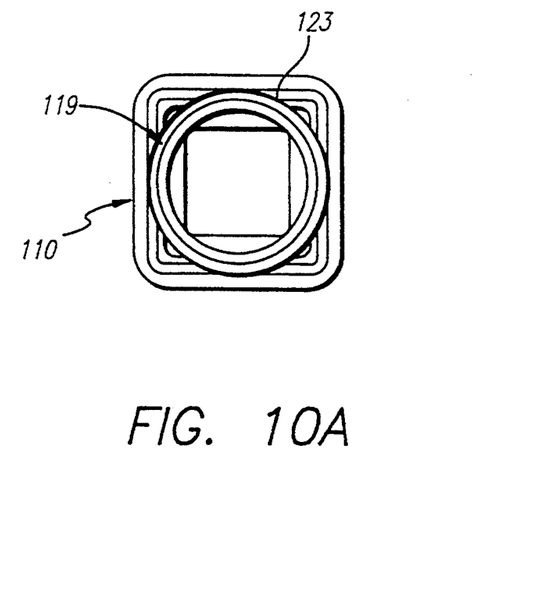
FIG. 10A is a schematic end view of the portion of FIG. 10, as viewed from the left.
Figure 10B:
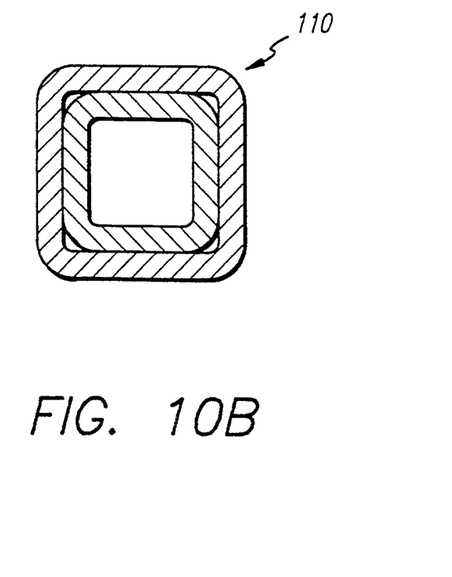
FIG. 10B is a schematic end view of the portion of FIG. 10, as viewed from the right.

Referring to FIGS. 10, 10A, and 10B, the illustrated second bracket portion 110 has an elongated first or forward section 112 that is generally square in cross-section externally for being received in a close sliding fit within the receptacle 102 of the first portion 100. The illustrated forward section 112 is rigidly connected (as by welding or other suitable means) to a rearwardly extending central section 114 that also has a generally square exterior cross-section. The exterior size of the central section 114 is somewhat smaller than the exterior size of the forward section 112. The central section 114 may be fabricated from a plurality of pieces that are firmly and rigidly secured to one another in a permanent way as by welding or the like.

As shown best in FIG. 10, the illustrated central section 114 is formed from a tubular inner piece 116 and a tubular outer piece 118. Both pieces 116, 118 are generally square in cross-section. The outer piece 118 has a relatively thin wall and its forward end abuts the rearward end of the section 112. The exterior of the outer piece 118 defines an elongated exterior surface that is generally square in cross-section and somewhat smaller in cross-section than the exterior surface of the first section 112 by slightly more than the thickness of the extension 20. The interior piece 116 has a thicker wall and its forward end is permanently fixed within the rearward end of the forward section 112. The rearward end of the outer piece 118 extends a distance rearwardly from the rearward end of the inner piece 116.

The second portion 110 further includes an elongated rearward section 119 that has a circular exterior cross-section (FIG. 10A). The details and function of portion 110 will be described below.

Figure 11:
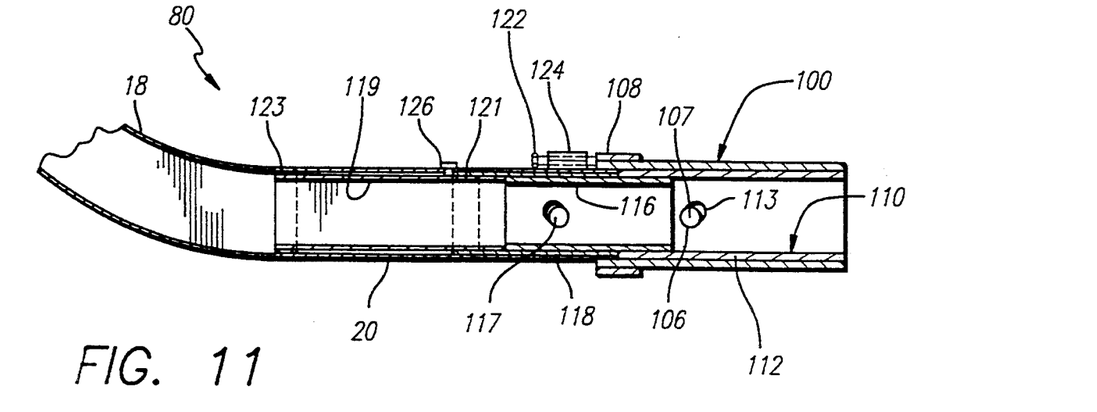
FIG. 11 is a schematic side view of the carrier assembled with the bracket.
Figures 12, 13, 14:
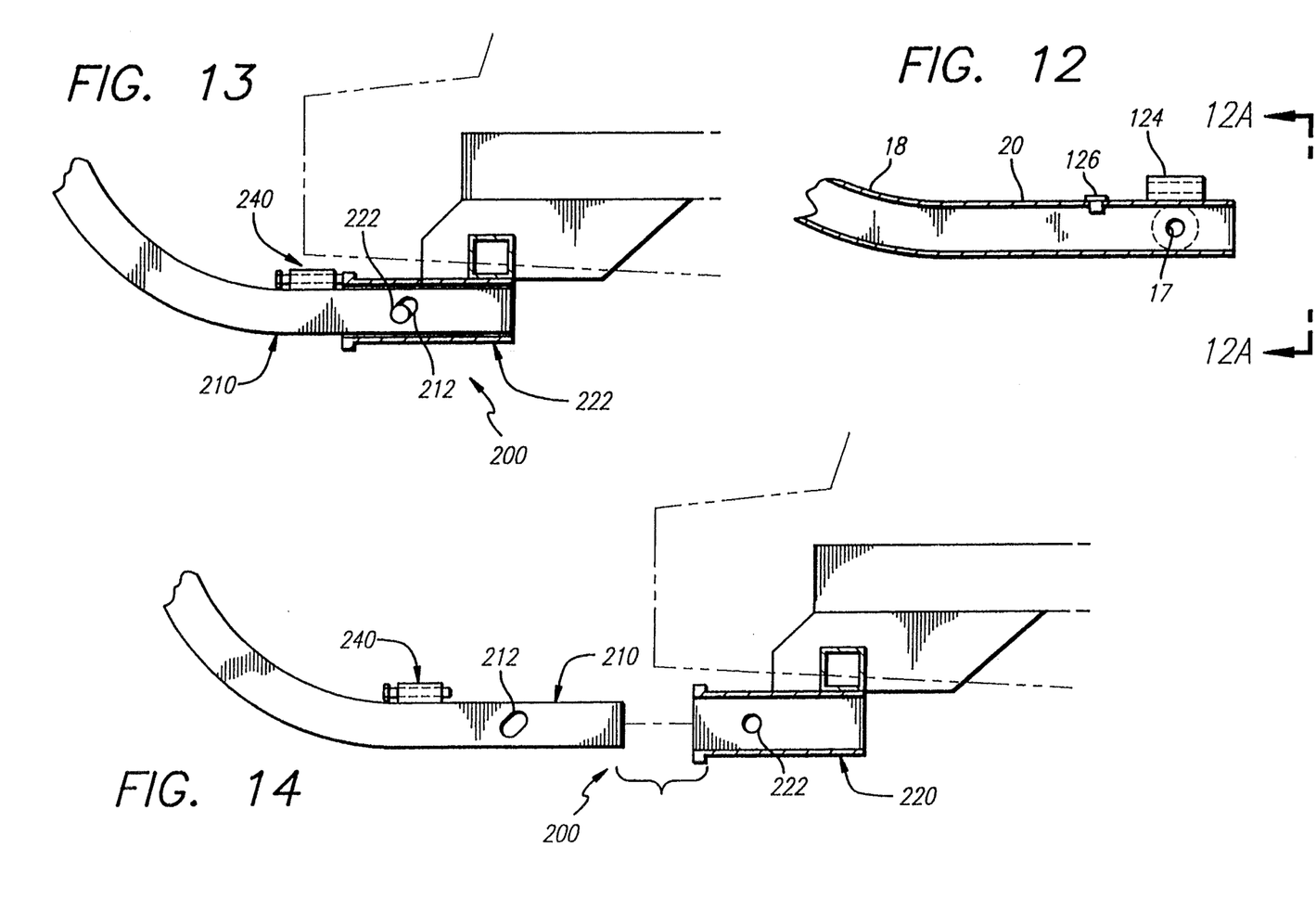
FIG. 12 is a schematic side view of the forward extension of the carrier.
FIG. 13 is a schematic side view of another form of bracket, in its assembled condition.
FIG. 14 is a schematic side view of the bracket of FIG. 13, in its pre-assembled condition.
Figure 12A:
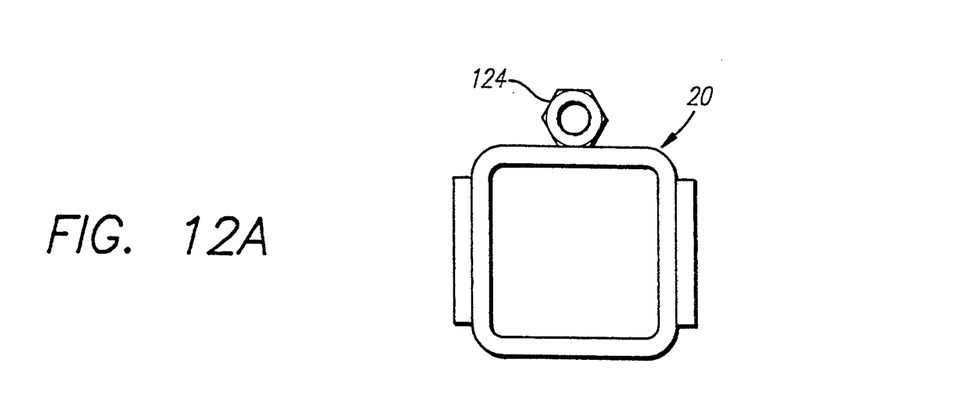
FIG. 12A is a schematic end view of the extension of FIG. 12, as viewed from the right.

As shown in FIGS. 12 and 12A, the elongated forward extension 20 of the upright carrier rod 18 is square in cross-section and has a hollow elongated interior that is square in cross-section and closely matches the exterior square cross-section of the outer piece 118 of the central section 114. When the carrier and the bracket are assembled as shown in FIG. 11, the forward extension 20 is telescoped over the outer piece 118, with the forward end of the extension 20 in close proximity to the rearward end of the forward section 112. Similarly, the forward section 112 and the forward end of the extension 20 are telescoped within the first bracket portion 100. These telescoping engagements of structure with square cross-sections generally prevent relative rotation and generally maintain the carrier rod 18 upright.

The arrangement that holds the extension 20 to the bracket and the bracket portions 100, 110 to one another in a firm, rigid, non-tilting manner will now be described. In general, a pair of transverse channels are formed in the structures. More particularly as shown best in FIG. 9, the first bracket portion 100 has a pair of opposed holes 106 that define a channel that extends generally transversely of the portion and intersects the axis of the portion. These illustrated holes 106 are circular and have a diameter of approximately ⅜ inch. A locking pin 107 of slightly small diameter in cross-section may be inserted transversely through these holes 106 (see FIG. 11), with portions of the pin extending outwardly at either side of the first portion 100. The transverse locking pin 107 may be formed with a suitable handle portion at one end (not shown) for ease of handling. The pin 107 may be selectively maintained in place as by a suitable lock, clip or the like (not shown).

As shown best in FIG. 10, the forward section 112 of the middle portion 110 has a pair of opposed side openings 113 that are generally aligned with the openings 106 of the first portion 100 when the middle portion 110 is assembled with the first portion. These openings 113 also form a transverse channel. As shown best in FIG. 11, the channel formed by the openings 113 includes a main channel section that for the most part overlies and coincides with the main channel section formed by the openings 106. The openings 113 however are somewhat enlarged, extending upwardly and forwardly as seen in FIGS. 10 and 11 to provide a secondary channel section. As seen in cross-section the channel of openings 113 is in the shape of an elongated slot that has one end centered at the central axis of the bracket portions and that then is inclined or angled away from that central axis. The illustrated openings 113 have rounded corners, however the openings could be other shapes such as inclined rectangles and the locking pin 107 could also have different matching shapes such as square in section. This arrangement creates camming or wedging surfaces at the edges of the openings 113 which act to firmly and solidly lock the center portion 110 to the forward portion 100 as will be described below. In general, the center portion 110 is moved axially rearwardly a short distance relative to the forward portion 100, causing the surfaces of the openings 106, 113 to engage the transverse locking pin 107, which in turn causes the middle or center portion 110 to be jammed or wedged downwardly into a firm, rigid, locked relationship with the forward portion 110.

As shown in FIG. 12, the forward extension 20 has a similar pair of transverse channel-forming circular opposed holes 17. As shown in FIGS. 10 and 11, the center bracket portion 110 has a second pair of enlarged channel-forming holes 115 similar to holes 113 (elongated slots in section). The holes 115 extend through the inner piece 116 and the outer piece 118. The holes 115 are enlarged in the upward rearward direction. Thus, when the extension 20 is moved axially relative to the middle portion 110, the same kind of wedging and jamming action is provided by the interface between a second transverse locking pin 117 (FIG. 11) that is positioned through the openings 17 and 115. This jams and wedges the center bracket portion 112 relative to the forward extension 20 of the carrier rod to maintain them in fixed rigid relationship with one another. The pin 117 may have suitable means such as a lock or clip (not shown) to selectively hold it in place.

This relative axial movement is achieved by a set screw 122 which is mounted in a block 124 fixed to the outside of the forward extension 20 (see FIGS. 11 and 12). The set screw 122 is threaded through the block 124 and abuts the rearwardly facing end of the forward carrier portion 100. In this regard, the portion 100 has a square outer ring 108 permanently fixed to the rearward end of the main part of the portion 100. Advancing the set screw 122 in the forward direction urges the extension 20 rearwardly relative to the central bracket portion 110, and also urges the second bracket portion rearwardly relative to the forward bracket portion 100. This creates the relative axial movement between the forward and central bracket portions 100, 110 and between the central bracket portion 110 and the extension 20 to lock or wedge these parts to one another and restrict or limit relative rotation and side to side sway of the carrier upright section 18.

The illustrated bracket 80 also allows for the carrier to be tilted to the side to provide access to the rear of the vehicle.

The bracket center portion 110 has the elongated rearward section 119 that is circular in exterior cross-section (FIG. 10A). The section 119 is permanently secured to the rearward end of the center section 114. In particular, the forward end of section 119 is telescoped into the rearward end of the outer piece 118 and into abutment or close proximity to the rearward end of the inner piece 116. A pair of tubular circular outer rings 121, 123 are permanently fixed to the section 119. One ring 123 is at the rear end of the section 119. The other ring 121 is adjacent to the rear end of the outer piece 118. These rings 121, 123 are received in a close sliding fit within the extension 20 so that when the locking pin 117 is removed from holes 115, 17, the extension 20 can slide rearwardly relative to the bracket.

A locking bolt or screw 126 is threaded through the wall of the extension 20 to engage the ring 123 to prevent the extension being unintentionally moved rearwardly so as to separate the extension from the bracket. To allow the extension 20 to be completely removed from the bracket, the bolt 126 may be sufficiently withdrawn to allow the ring 123 to pass.

When the extension 20 is unlocked by removal of the pin 117 and is slid rearwardly so that the square extension no longer is telescoped onto the square outer piece 118, the extension is then free to rotate about the circular section 119 and its rings 121, 123. This allows the carrier and its load to be moved to the side. Suitable mechanical stops (not shown) may be provided to limit this rotation and sideward movement.

The bracket may be utilized in a simplified form, as shown in FIGS. 13 and 14, which does not provide the selective pivoting movement. Bracket 200 comprises a pair of elongated portions 210, 220 that are noncircular in cross-section and telescopically fit together. One portion 210 may be fixed to the carrier and the other portion 220 may be fixed to the vehicle. Each portion 210, 220 has means defining a transverse channel 212, 222. One channel 212 has a main section that is generally circular in cross-section and the other channel 222 has a main section that generally coincides with the first channel 212. In addition the channel 212 has a secondary section that extends away from the main section and is at an angle to the common axis of the portions. A locking pin (not shown) is provided for extending transversely through the channels when they are aligned. Means 240 are also provided for selectively moving the portions 210, 220 axially relative to one another so as to wedge the pin in the channels 212, 222 to firmly and rigidly lock the portions to one another and thereby limit side to side swaying of the carrier. Means 240 may be like the set screw arrangement provided in bracket 80.

Various modifications may be made in the illustrated structure without departing from the spirit and scope of the present invention as set forth in the following claims.

For example, the cross-sections need not necessarily be square but might be other non-circular shapes that will prevent relative rotation while providing adequate support for the transverse locking pins.

For some applications the first and second bracket portions might be integrated together in their design or permanently fixed to one another as by welding, so long as circular and non-circular sections were provided. This would eliminate the need for a second locking pin arrangement. The illustrated arrangement bracket 80 is convenient, however, in that only the first portion needs to be fixed to the vehicle and the second bracket portion can be easily removed and stored when not in use by simply removing the locking pin 107.

It will also be noted that the illustrated extension 20, contributes a functional portion of the bracket arrangement. If desired, the bracket could have a third portion in place of the extension 20, and such third portion could be suitably fixed to the carrier.

What is claimed is:

1. An improved bracket for firmly and rigidly supporting a support structure of a vehicle mountable carrier, said bracket comprising;
   a first portion for being rigidly connected to the carrier support structure,
   a second portion for being rigidly mounted on a vehicle,
   one of said portions being elongated, having a central axis that extends generally horizontally, and having an elongated internal receptacle that is open at one end,
   the other of said portions being elongated, having a central axis that extends generally horizontally, and being configured to be assembled with the other portion by being received in said receptacle with the axes of the two portions generally co-aligned along a central axis, said other portion having an external shape in section that is slightly smaller than the shape in section of said receptacle,
   each of said portions having a means that defines an open channel that extends transversely of its portion,
   said channels being transversely co-aligned when said portions are assembly with one another in a predetermined relationship,
   an elongated locking member configured to be assembled with said portions by being inserted through said channels when they are co-aligned,
   each of said channels having a main section for aligning with the other of said channels when said portions are in said predetermined relationship, and one of said channels having a secondary section that extends away from its associated main section in a direction at an angle to said central axis,
   means for selectively causing relative axially movement of the assembled portions with regard to one another to a locked position where wedging action between said secondary channel section and said locking member caused by such relative axial movement serves to firmly and rigidly lock the portions to one another against tilting movement therebetween, said means also maintaining the portions in such locked position.

2. The bracket of claim 1 wherein said main channel sections generally intersect said central axis, said main channel sections being generally circular in cross-section and said secondary section being a generally smooth extension of its associated circular main section.

3. The bracket of claim 1 wherein said support structure supports holder means for skis.

4. The bracket of claim 1 further including means that selectively (1) lock the support structure of the carrier in place, and (2) unlock the support structure of the carrier and thereby allow it to be moved away from the vehicle.

5. The bracket of claim 1 in combination with a said support structure of a vehicle mountable carrier, said carrier being a carrier for skis with enlarged bindings, said carrier comprising:
   1) a rigid frame connected to said first portion of said bracket, the frame extending rearwardly from the vehicle and then upwardly, the frame including an elongated upright section,
   2) a pair of holder units mounted on the elongated upright section at locations vertically spaced-apart therealong by somewhat more than the length of the ski bindings, each of said units being in the form of a rigid, generally flat structure of a tough tamper-resistent material and extending generally horizontally at right angles to said elongated upright section, the first of said holder units having means defining at least one pair of first receptacles for each receiving therethrough one end portion of a ski extending generally upright and parallel to the elongated section to retain the ski against either transverse or front to back movement, said first receptacles each being fully enclosed, elongated, and generally conforming to the size of a ski, but being smaller than the size of the enlarged binding of the ski, the second of said holder units having a base and means on the base defining at least one pair of second receptacles for each receiving therethrough the opposite end portion of a ski to retain the ski against either transverse or front to back movement, said first and second receptacles being respectively generally aligned with one another, said second receptacles each being elongated, having an entrance opposite said elongated upright section, and generally conforming to the size of a ski, but being smaller than the size of the enlarged binding of the ski, said second holder unit also having an elongated rigid gate member of tough tamper-resistant material, said gate member being mounted for movement between a closed position which closes off the receptacle entrances of said second holder unit and a open position spaced away from said receptacles entrances to allow access to said receptacles.

6. The bracket and carrier of claim 5 wherein at least one of said holder units is vertically adjustable along said upright frame section.

7. The bracket and carrier of claim 6 when both of said holder units are vertically adjustable along said frame section.

8. The bracket and carrier of claim 6 wherein means are provided to selectively lock said movable holder unit onto said elongated frame section.

9. The bracket and carrier of claim 5 wherein said ski holding receptacles are each an elongated slot extending front to rear so as to hold the skis parallel to the direction of travel of the vehicle.

10. The bracket and carrier of claim 5 wherein said elongated frame section has a non-circular cross-section, said holder units each having a sleeve secured thereon having a interior cross-section generally matching that of the upright frame section cross-section to limit rotation of the holder units about the frame section, the upper end of said upright section having an enlarged portion to retain said sleeves of said holder units on said upright section.

11. The bracket and carrier of claim 10 wherein said upright section, cross-section and said sleeve cross-section are both generally rectangular.

12. The bracket and carrier of claim 11 wherein said sleeves are generally U-shaped with an open end, each holding unit also having clamping means provided across the open end of its sleeve to lock said sleeve to said upright section and also to allow clamping said sleeve to said upright section at a selected position along said upright section.

13. The bracket and carrier of claim 5 wherein said lower holder unit has means defining a lower receptacle for receiving therethrough and limiting transverse movement of the lower end portions of ski poles that are disposed generally upright, said means also engaging the cups at the lower ends of the ski poles to limit longitudinal movement of the poles, said upper holder unit having means defining an upper receptacle for receiving therethrough and retaining against transverse movement the upper end portions of such ski poles, said gate member also closing said pole receiving receptacle of said second holder unit when said gate member is in its closed position and affording access to said ski pole holding receptacle from the rear when said gate member is in its open position.

14. The bracket and carrier of claim 5 wherein each of said holder units comprises an elongated transverse base length, a plurality of separator lengths each rigidly attached at one end to the base length at spaced-apart location therealong and extending outwardly therefrom, adjacent pairs of said separator lengths forming said ski-receiving receptacles between them, said receptacles each being an elongated slot that extends at generally right angles to said base length, said holder units also including an elongated transverse second length connected to at least two of the separator lengths to close off the outer ends of the receptacle slots opposite the transverse base length.

15. The bracket and carrier of claim 14 wherein the second length of at least one of said holder units is mounted for selective movement away from said separator lengths to afford access to said receptacle slots from said outer ends thereof.

16. The bracket and carrier of claim 15 wherein said transverse second length is pivotally mounted at one end to one of said separator lengths and has latch means at its other end for releasably engaging and latching with another of said separator lengths to thereby provide an openable gate to afford access to said outer ends of said receptacles and for closing and locking said receptacles.

17. The bracket and carrier of claim 14 wherein each of said holder units also includes a transverse middle length extending between a spaced-apart pair of said separator lengths, said middle length being spaced from said second transverse length to define a receptacle therebetween for receiving therethrough the ski poles, said ski pole holding receptacles of said holder units being generally aligned with each other respectively.

18. The bracket and carrier of claim 17 wherein the middle length for at least one of said carrier units is spaced from the adjacent portion of the transverse second length both outwardly from the base length and in the direction of the upright frame section.

19. The bracket and carrier of claim 17 wherein said ski pole holding receptacle is an elongated transversely extending slot.

20. The bracket and carrier of claim 19 wherein the spacing of said lengths in the direction of the upright section allows the ski poles to be inserted into the slot from at least one end of such slot.

21. The bracket and carrier of claim 5 wherein the minimum thickness of the means defining a ski-holding receptacle is at least about 0.250 of an inch.

22. The bracket of claim 1 in combination with a carrier for skis and ski poles, said carrier comprising:
1) a rigid frame, the frame including an elongated section,
2) a pair of holder units mounted on the elongated section at locations spaced-apart therealong by at least the length of the ski bindings, each of said units being in the form of a rigid, generally flat structure of a tough tamper-resistent material and extending generally at right angles to said elongated section, the first of said holder units having means defining at least one pair of first receptacles for each receiving therethrough one end portion of ski extending generally parallel to the elongated section to retain the ski against transverse movement, said first receptacles each being fully enclosed, elongated, and generally conforming to the size of a ski, but being smaller than the size of the enlarged binding of the ski, the second of said holder units having a base and means on the base defining at least one pair of second receptacles for each receiving therethrough the opposite end portion of a ski to retain the ski against transverse movement, said first and second receptacles being respectively generally aligned with one another, said second receptacles each being elongated, having an entrance opposite said elongated section, and generally conforming to the size of a ski but being smaller than the size of the enlarged binding of the ski, said second holder unit also having an elongated rigid gate member of tough tamper-resistant material, said gate member being mounted for movement between a closed position which closes off the receptacle entrances of said second holder unit and an open position spaced away from said receptacles entrances to allow access to said receptacles.

23. The bracket and carrier of claim 22 wherein the minimum thickness of the means defining a ski-holding receptacle is at least about 0.25 of an inch.

24. The bracket of claim 1 in combination with a vehicle mountable ski carrier and having a rigid frame connected to said first portion of said bracket, the frame including an elongated upright section, an improved holder unit, said holder unit comprising:
1) a rigid, generally flat, unitary integrally formed base made of a tough tamper-resistant material, said base unit being mountable on the elongated section of said carrier extending outwardly at generally right angles to said elongated section, said base including means defining at least two outwardly opening individual slots for individual skis, said slots opening outwardly away from the elongated section, there being at least two of said slots side-by-side at each side of said base, said slots each being elongated in said outward direction and each being open to form an entrance at its outward end, and
2) an elongated rigid gate member of tough tamper-resistant material mounted on said base for selective movement between a closed position extending across said slot entrances to close said slots and an open position spaced away from said entrances to allow access into and out of said slots.

25. The bracket, carrier and holder unit of claim 24 further including means on said base that combines with said gate member, when the gate member is in the closed position, to form a transversely extending central slot for receiving ski poles extending therethrough.

26. The bracket, carrier and holder unit of claim 24 further including an outer covering of a material having a relatively soft resilient outer surface.

27. The bracket, carrier and holder unit of claim 26 wherein said outer covering is essentially seamless over the entire unit including the gate, except for a separation at each end of the gate to allow for relative movement between the gate and the rest of the unit.

28. The bracket of claim 1 in combination with a carrier and a holder unit forming a portion of said carrier for skis and ski poles, said carrier comprising a frame having an elongated support section, the ski poles each having an elongated shaft and a cup at its lower portion, said holder unit being a generally flat, rigid unitary integral structure made of a tough tamper-resistant material, said unit comprising:
1) first means defining a plurality of individual slots for each receiving a ski therethrough, each of said slots having a continuous solid rigid perimeter, at least two of said slots being provided at each side of said unit,
2) second means defining a transversely extending central receptacle for the lower portions of the ski poles, said second means including a transversely extending inner member located in a first plane that is perpendicular to the elongated support section, said second means also including a transversely extending elongated outer member that is in a second plane perpendicular to the elongated support section and spaced above the inner member by a distance greater than the height of the cup of a ski pole, the inner member providing the inner edge of the receptacle and the outer edge providing the outer edge of the receptacle, said inner edge being spaced from said outer edge by a distance greater than the thickness of the shaft of a ski pole, said receptacle having an entrance at least one side and there being sufficient clearance adjacent said entrance to allow the end of a ski pole below the cup of the pole to be positioned and moved sideways into the receptacle inwardly of said outer edge of the receptacle while the portion of the shaft immediately above the cup of the ski assumes a position outwardly of said inner edge, said cup assuming a position extending inwardly below said inner member and extending outwardly above said outer member, whereby the ski pole in such position has its movement limited in the upward, downward, forward and rearward directions, the carrier also having means for limiting the side-to-side movement of the ski poles so as to retain the ski poles in the receptacle of the holder unit.

29. The bracket, carrier and holder unit of claim 28 wherein said holder unit comprises:
1) an elongated transversely extending base length,
2) a plurality of separator lengths connected at their inner ends to the base length and extending at right angles thereto so as to and provide at least two of ski receiving receptacles at each side of said holder unit, there being two interior shorter separator lengths and two exterior longer separator lengths,
3) a transversely extending middle length connected between the outer ends of the two interior separator lengths and lying in a first plane that extends at right angles to the support frame section, said middle length being generally parallel to said base length,
4) a transversely extending outer length that is connected between the outer ends of the exterior separator lengths, said outer length having a central portion that extends transversely, generally parallel to said middle length, and lys in a second plane spaced below said first plane, said outer length also having a pair of side portions that incline downwardly and toward the center from the outer ends of said exterior separator lengths to the ends of said central portion.

30. The carrier and holder unit of claim 28 wherein the minimum thickness of the lengths defining a ski-holding receptacle is at least about 0.250 of an inch.

31. The bracket, carrier and holder unit of claim 28 further including an outer covering of a material having a relatively soft resilient outer surface.

32. The bracket, carrier and holder unit of claim 31 wherein said outer covering is essentially seamless.

33. An improved bracket for firmly and rigidly supporting a support structure of a vehicle mountable carrier while allowing the carrier to be selectively moved out of the way, said bracket comprising;

a first portion for being rigidly connected to the carrier support structure, a second portion for being rigidly mounted on a vehicle, one of said portions having a first section that is elongated, has a central axis that extends generally horizontally, and has an elongated internal receptacle that is open at one end and has a non-circular cross-section, the other of said portions having a first section that is elongated, has a central axis that extends generally horizontally, and has a non-circular external cross-section slightly smaller than that of said receptacle to be assembled with the other first section by being received in said receptacle with the axes of the two sections generally co-aligned along a central axis, each of said first sections having a means that defines an open channel that extends transversely of its section.

said channels being transversely co-aligned when said sections are assembly with one another in a predetermined relationship, an elongated locking member configured to be assembled with said sections by being inserted through said channels when they are co-aligned, each of said channels having a main section for aligning with the other of said channels when said portions are in said predetermined relationship, and one of said channels having a secondary section that extends away from its associated main section in a direction at an angle to said central axis, means for selectively causing relative axially movement of the assembled portions with regard to one another to a locked position where wedging action between said secondary channel section and said locking member caused by such relative axial movement serves to firmly and rigidly lock the portions to one another against tilting movement therebetween, said means also maintaining the portions in such locked position, one of said portions also having a second section axially aligned with its first section, said second section having an elongated annular pivot surface that is circular in cross-section and proportioned to mate with the non-circular cross-section of the first section of the other of said portions to afford pivoting movement between said portions when said second section is overlapped with said mating first section, and means for selectively maintaining said first sections either overlapping and locked against relative rotation or non overlapping but with said second section and the mating first section overlapping for such relative rotation.

34. The bracket of claim 33 wherein said non-circular cross-sections are generally rectangular.

35. The bracket of claim 33 wherein said means for causing axial movement comprises an axially extending set screw.

36. The bracket of claim 33 wherein said first portion is connected to the carrier support structure by means defining a second pair of transverse channels and a second locking member.

37. The bracket of claim 33 wherein said main channel sections generally intersect said central axis, said main channel sections being generally circular in cross-section and said secondary section being a generally smooth extension of its associated circular main section.

* * * * *